US012126112B2

(12) United States Patent
Kawamoto et al.

(10) Patent No.: US 12,126,112 B2
(45) Date of Patent: *Oct. 22, 2024

(54) CONNECTOR PROTECTIVE KAP

(71) Applicant: CenturyLink Intellectual Property LLC, Broomfield, CO (US)

(72) Inventors: Pete A. Kawamoto, Littleton, CO (US); Diana L. Unser, Lakewood, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 457 days.

This patent is subject to a terminal disclaimer.

(21) Appl. No.: 17/496,845

(22) Filed: Oct. 8, 2021

(65) Prior Publication Data

US 2022/0029348 A1 Jan. 27, 2022

Related U.S. Application Data

(63) Continuation of application No. 16/797,257, filed on Feb. 21, 2020, now Pat. No. 11,152,739.

(60) Provisional application No. 62/930,981, filed on Nov. 5, 2019.

(51) Int. Cl.
*H01R 13/52* (2006.01)
*H01R 13/50* (2006.01)
*H01R 43/00* (2006.01)

(52) U.S. Cl.
CPC ....... *H01R 13/5202* (2013.01); *H01R 13/501* (2013.01); *H01R 13/5205* (2013.01); *H01R 43/005* (2013.01)

(58) Field of Classification Search
None
See application file for complete search history.

(56) References Cited

U.S. PATENT DOCUMENTS

| | | | | |
|---|---|---|---|---|
| 5,630,419 | A | 5/1997 | Ranalletta | |
| 7,845,990 | B2 | 12/2010 | Shrum | |
| 8,870,587 | B2 | 10/2014 | Nooner | |
| 2015/0380861 | A1* | 12/2015 | Harwath | G02B 6/3893 385/86 |
| 2017/0018871 | A1 | 1/2017 | Vaccaro | |
| 2019/0140390 | A1* | 5/2019 | Refai | H01R 13/582 |
| 2019/0148873 | A1* | 5/2019 | Poterjoy | H01R 13/501 439/587 |
| 2021/0135395 | A1 | 5/2021 | Kawamoto | |

* cited by examiner

*Primary Examiner* — James Harvey

(57) ABSTRACT

Novel tools and techniques are provided for implementing an enclosure for protecting at least one connector of a cable. In some embodiments, an enclosure comprises an enclosure housing. The enclosure housing includes a first part and a second part. The first part of the enclosure housing is attached to the second part of the enclosure housing. The first part of the enclosure housing and the second part of the enclosure housing together define a chamber to fully enclose a connector assembly and a connector housing the at least one connector of the cable. The enclosure includes at least one opening disposed at a first end of the enclosure housing. The at least one opening is configured to allow a boot of the at least one connector or the cable of the at least one connector to extend through the at least one opening.

19 Claims, 6 Drawing Sheets

CONNECTOR PROTECTIVE KAP

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatus for implementing a protective cap, and, in particular embodiments, to methods, systems, and apparatuses for implementing an enclosure for protecting at least one connector of a cable or a wire.

BACKGROUND

Traditionally, in order to protect one or more connectors of a copper cable or a copper wire, electrical tape was wrapped around the connectors. However, electrical tape typically only lasts for one use and cannot be reused. Further, the electrical tape typically leaves a sticky residue on the connector of the cable or the wire.

Hence, there is a need for more robust and scalable solutions for implementing a protective cap, and, in particular embodiments, to methods, systems, and apparatuses for implementing an enclosure for protecting at least one connector of variable types of cable or wire.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
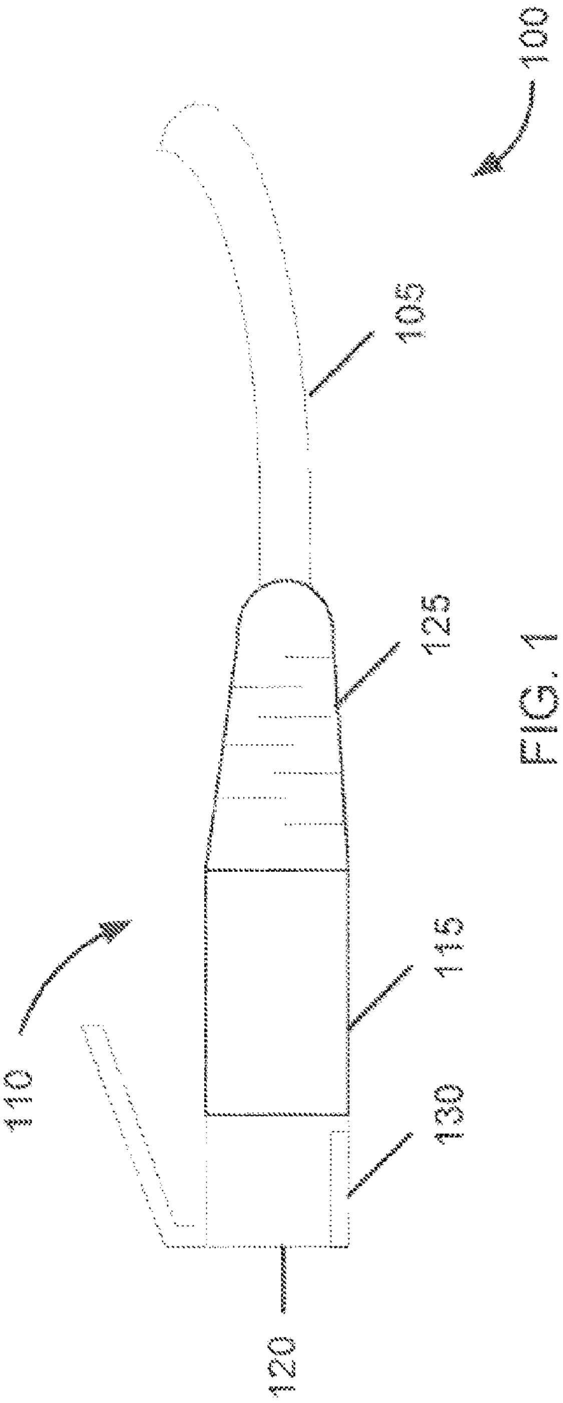
FIG. 1 is a schematic diagram illustrating an ethernet connector, in accordance with various embodiments.

Various embodiments provide tools and techniques for implementing a protective cap, and, in particular embodiments, to methods, systems, and apparatuses for implementing an enclosure for protecting at least one connector of a cable or a wire.

In various embodiments, an enclosure for protecting at least one connector of a cable might include an enclosure housing. The enclosure housing might include a first part of the enclosure housing and a second part of the enclosure housing attached to the first part of the enclosure housing. The first part of the enclosure housing and the second part of the enclosure housing together might define a chamber to fully enclose a connector assembly and a connector housing comprising the connector assembly of the at least one connector of the cable. The enclosure might further include at least one opening disposed at a first end of the enclosure housing. The at least one opening may be configured to allow at least one of a boot of the at least one connector or the cable of the at least one connector to extend through the at least one opening.

Several advantages are realized by providing the enclosure for protecting at least one connector of a cable. In a non-limiting example, the enclosure may be reused multiple times. Further, the enclosure may protect the connector assembly and the connector housing from dust and debris. Additionally, the enclosure may be water resistant and protect the connector assembly and the connector housing from water.

Various uses or implementations may be made to the various embodiments and examples without departing from the scope of the invention. For example, while the embodiments described above refer to particular features or particular uses, the scope of this invention also includes embodiments having different combination of features or uses, and the embodiments that do not include all of the above described features.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, an enclosure for protecting at least one connector of a cable might comprise an enclosure housing. The enclosure housing might include a first part of the enclosure housing and a second part of the enclosure housing. The first part of the enclosure housing might be attached to the second part of the enclosure housing. The first part of the enclosure housing and the second part of the enclosure housing together might define a chamber to fully enclose a connector assembly and a connector housing comprising the connector assembly of the at least one connector of the cable. The enclosure might further include at least one opening disposed at a first end of the enclosure housing. The at least one opening may be configured to allow at least one of a boot of the at least one connector or the cable of the at least one connector to extend through the at least one opening.

The at least one connector might include, without limitation, at least one of an ethernet connector, a fiber connector, or a copper cable connector, and/or the like. The cable might include, without limitation, at least one of an ethernet cable, a fiber, or a copper cable, and/or the like.

The enclosure housing might have at least one of an oval shape, a square shape, or a rectangular shape, and/or the like. The enclosure housing might be made from plastic or other similar material.

In some embodiments, the first part of the enclosure housing may be attached to the second part of the enclosure housing via at least one of a hinged connection or a snap connection. Additionally and/or alternatively, a first side of the first part of the enclosure housing may be attached to a first side of the second part of the enclosure housing via a hinged connection, and a second side of the first part of the enclosure housing may be connected to a second side of the second part of the enclosure housing via a snap connection.

In some instances, the first part of the enclosure housing may be sealingly attached to the second part of the enclosure housing. Additionally and/or alternatively, the first part of the enclosure housing may be sealingly connected to the second part of the enclosure housing via a grommet that extends along an edge of at least one of the first part of the enclosure housing or the second part of the enclosure housing.

In various embodiments, the at least one opening sealingly surrounds at least one of the boot of the at least one connector or the cable extending through the at least one opening. A grommet may be sealingly attached to the at least one opening to sealingly surround at least one of the boot of the at least one connector or the cable extending through the at least one opening.

In various cases, the enclosure might further include a tether. The tether may be attached to an outer surface of the enclosure housing. The tether may configured to attach the enclosure to the cable. A first end of the tether may be adjustable and may be configured to fit over the at least one connector and to tighten over the cable.

In some instances, the at least one connector may include at least two connectors and the chamber may be configured to fully enclose the connector assembly and the connector housing comprising the connector assembly corresponding to each connector. The at least two connectors may be two single connectors, a dual connector, two dual connectors, and/or the like. At least one of the boot corresponding to each connector or the cable corresponding to each connector may extend out of the at least one opening.

In some instances, the at least one connector may include at least two connectors and the chamber may be configured to fully enclose the connector assembly and the connector housing comprising the connector assembly corresponding to each connector. At least one of the boot corresponding to each connector or the cable corresponding to each connector may extend out of a corresponding opening.

The at least one opening may include two openings and the two openings may be disposed at the first end of the enclosure housing. Alternatively, the at least one opening might include at least two openings and the two openings may be disposed at opposite ends of the enclosure housing.

In another aspect, a system might comprise at least one connector of a cable and an enclosure. The at least one connector might include a connector housing comprising connector assembly and a boot attached to the connector housing and the cable.

The enclosure of the system might include an enclosure housing. The enclosure housing might include a first part of the enclosure housing and a second part of the enclosure housing. The first part of the enclosure housing might be attached to the second part of the enclosure housing. The first part of the enclosure housing and the second part of the enclosure housing together might define a chamber to fully enclose a connector assembly and a connector housing comprising the connector assembly of the at least one connector of the cable. The enclosure might further include at least one opening disposed at a first end of the enclosure housing. The at least one opening may be configured to allow at least one of a boot of the at least one connector or the cable of the at least one connector to extend through the at least one opening.

The at least one connector might include, without limitation, at least one of an ethernet connector, a fiber connector, or a copper cable connector, and/or the like. The cable might include, without limitation, at least one of an ethernet cable, a fiber, or a copper cable, and/or the like.

In a further aspect, a method might comprise providing an enclosure comprising an enclosure housing comprising a first part and a second part, the first part of the enclosure housing attached to the second part of the enclosure housing, wherein the first part of the enclosure housing and the second part of the enclosure housing together define a chamber to fully enclose a connector assembly and a connector housing comprising the connector assembly of the at least one connector of the cable and at least one opening disposed at a first end of the enclosure housing, wherein the at least one opening is configured to allow at least one of a boot of the at least one connector or the cable of the at least one connector to extend through the at least one opening; placing the at least one connector within the chamber; extending at least one of the boot of the at least one connector or the cable of the at least one connector through the opening; and closing the enclosure housing around the connector assembly and a connector housing comprising the connector assembly of the at least one connector.

The at least one connector might include, without limitation, at least one of an ethernet connector, a fiber connector, or a copper cable connector, and/or the like. The cable might include, without limitation, at least one of an ethernet cable, a fiber, or a copper cable, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

We now turn to the embodiments as illustrated by the drawings. FIGS. 1-8 illustrate some of the features of the method, system, and apparatus for implementing a protective cap, and, in particular embodiments, the methods, systems, and apparatus for implementing an enclosure for protecting at least one connector of a cable or a wire, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments. Further, the various components of the figures are merely illustrative and are not intended to be to scale.

Figure 2:
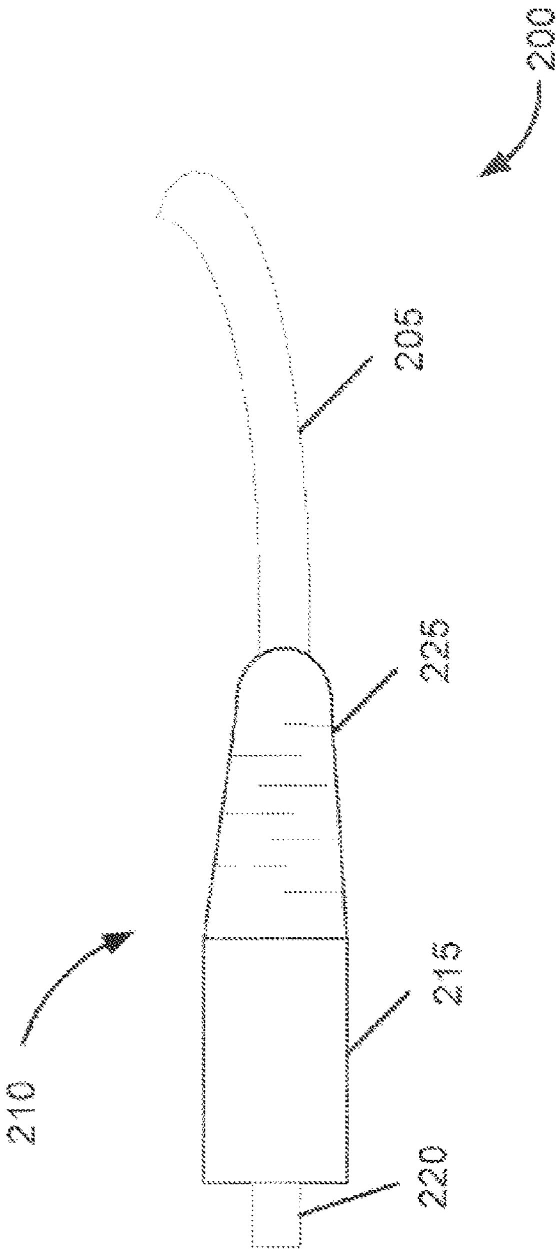
FIG. 2 is a schematic diagram illustrating a fiber connector, in accordance with various embodiments.

With reference to the figures, FIGS. 1 and 2 are schematic diagrams illustrating one or more connectors of a cable or a wire.

FIG. 1 is a schematic diagram of an ethernet cable 100. The ethernet cable 100 includes, without limitation, a cable 105 and a connector 110. The connector 110 includes, without limitation, a connector housing 115 and a connector assembly 120. The connector assembly 120 may be disposed in the connector housing 115 or protrude from the connector housing 115. The connector assembly 120 may contain one or more connector pins 130. In some cases, the connector 110 might optionally include a connector boot 125. Alternatively, in some cases, the connector 110 might not include the connector boot 125. The optional boot 125 may couple the connector housing 115 to the cable 105. Alternatively, the connector housing 115 may be directly coupled to the cable 105.

FIG. 2 is a schematic diagram of a fiber cable 200. The fiber cable 200 includes, without limitation, a cable 205 and a connector 210. The connector 210 includes, without limitation, a connector housing 215, a connector assembly 220, and a connector boot 225. The connector assembly 220 may be disposed in the connector housing 215 or protrude from the connector housing 215. The connector assembly 220 may comprise one or more fiber ferrules of the fiber cable 200. The boot 225 may couple the connector housing 215 to the cable 205.

Figure 3B:
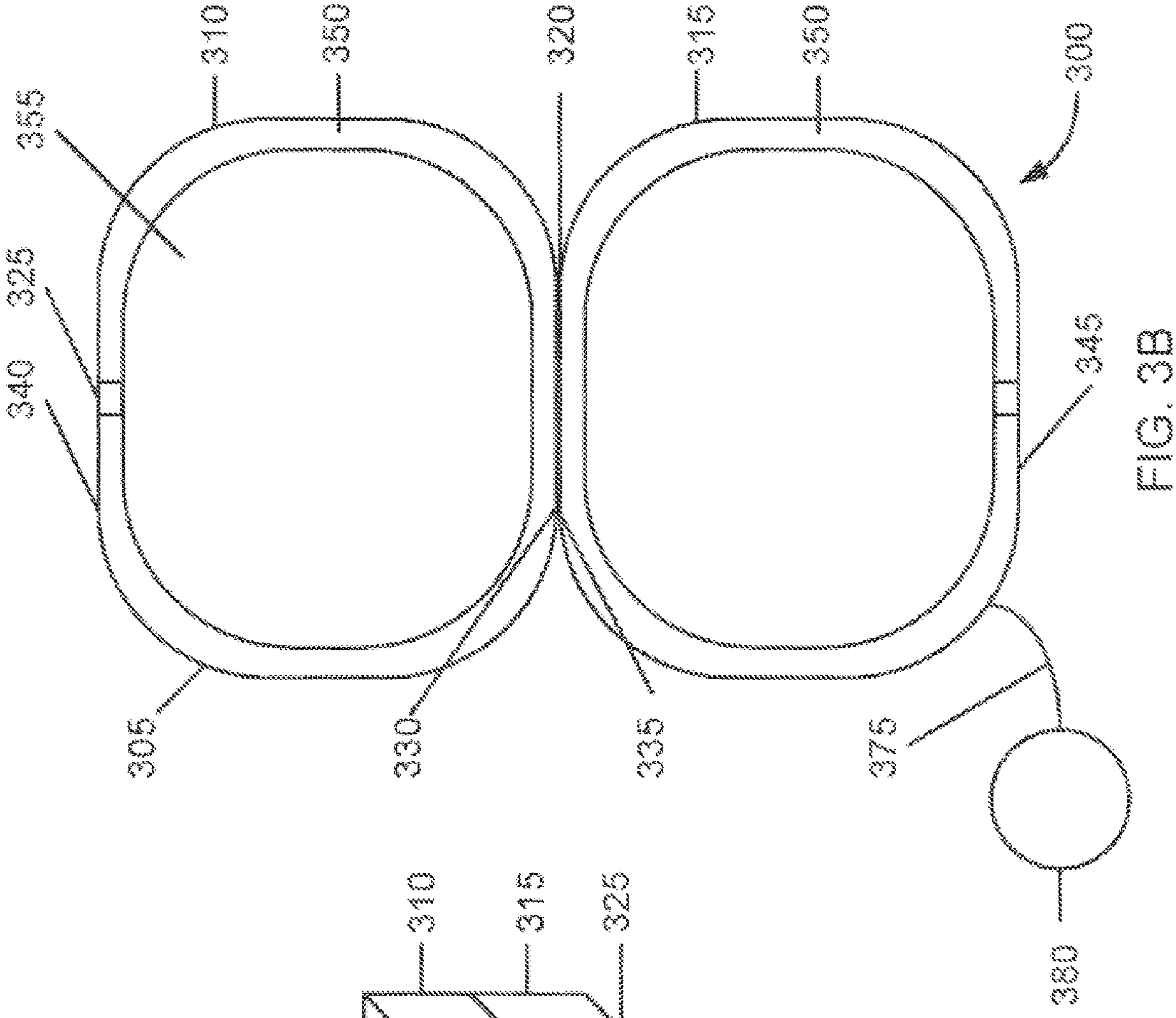
FIGS. 3A and 3B are schematic diagrams illustrating an enclosure for protecting a connector of a cable or a wire, in accordance with various embodiments.
Figure 3A:
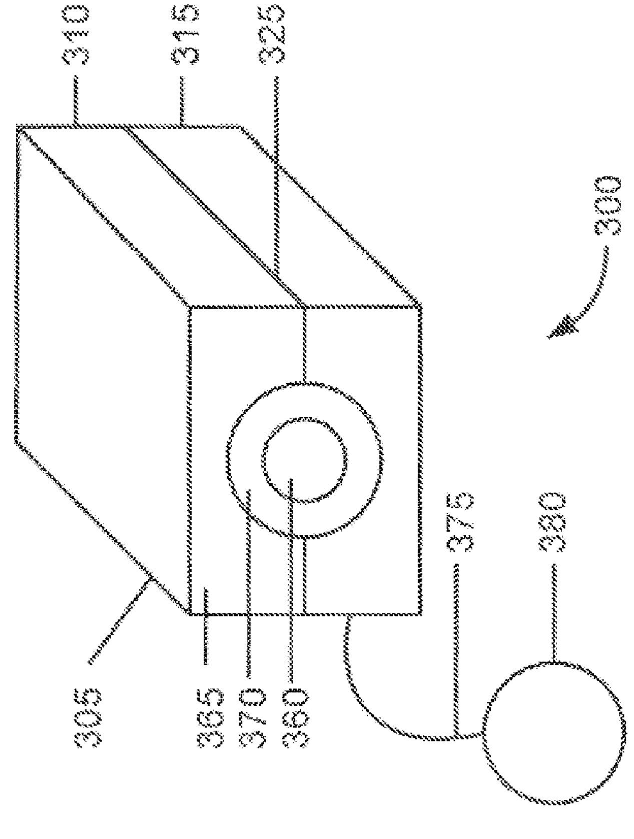

FIGS. 3A and 3B (collectively, "FIG. 3") are schematic diagrams illustrating an enclosure, cap, or KAP 300 for protecting a connector of a cable or a cable, in accordance with various embodiments.

FIG. 3A is a perspective view of the enclosure 300. FIG. 3B is a top view of an open enclosure 300.

In various cases, the enclosure 300 might include an enclosure housing 305. The enclosure housing 305 might have an oval shape, a square shape, a round shape, or a rectangular shape. The enclosure housing 305 may be made from plastic or other similar material.

In some embodiments, the enclosure housing 305 might include a first part 310 of the enclosure housing 305 and a second part 315 of the enclosure housing 305. The first part 310 of the enclosure housing 305 might be attached to the second part 315 of the enclosure housing 305. The first part 310 of the enclosure housing 310 may be connected to the second part 315 of the enclosure housing 305 via at least one of a hinged connection 320 or a snap connection 325, and/or the like. In some cases, a first side 330 of the first part 310 of the enclosure housing 305 is attached to a first side 335 of the second part 315 of the enclosure housing 305 via a hinged connection 320 and a second side 340 of the first part 310 of the enclosure housing 305 is connected to a second side 345 of the second part 315 of the enclosure housing 305 via a snap connection 325.

In some cases, the first part 310 of the enclosure housing 305 may be sealingly attached to the second part 315 of the enclosure housing 305. The first part 310 of the enclosure housing 305 may sealingly attached to the second part 315 of the enclosure housing 305 via a grommet 350 that extends along an edge of at least one of the first part 310 of the enclosure housing 305 or the second part 315 of the enclosure housing 305. These sealing attachments may prevent dust and/or water from entering the enclosure 300.

In various embodiments, the first part 310 of the enclosure housing 305 and the second part 315 of the enclosure housing 305 together define a chamber 355 to fully enclose a connector assembly and a connector housing of at least one connector of a wire or a cable.

The at least one connector of the wire or the cable may be an ethernet connector (as shown in FIG. 1) or a fiber connector (as shown in FIG. 2). However, the at least one connector is not limited to these two cases. The at least one connector might include at least one of an ethernet connector, a fiber connector, or a copper cable connector, and/or the like. The at least one wire or cable might include, without limitation, at least one of an ethernet cable, a fiber, or a copper cable.

The ethernet connector might include, without limitation, at least one of a Category 5 ("Cat5") connector or a Category 6 ("Cat6") connector, and/or the like. The fiber connector might include, without limitation, at least one of a subscriber connector ("SC") or a lucent connect ("LC"), and/or the like. The fiber connector might be a single connector or a dual connector, and/or the like.

The enclosure housing 305 might be sized to fit a variety of cable connectors and be easily swapped between connectors of different sizes. In a non-limiting example, the enclosure housing 305 may be sized to fit an ethernet connector, a fiber connector, a copper cable connector, and/or the like. In some cases, the enclosure housing 305 may be sized to fit at least two of an ethernet connector, a fiber connector, a copper cable connector, and/or the like. The size of the enclosure housing 305 may be ¼"-4"×¼"-4"×1"-5". Preferably, the size of the enclosure is 1"×1"×2".

The enclosure housing 305 might further include at least one opening 360 disposed at a first end 365 of the enclosure housing 305. The at least one opening 360 may be configured to allow at least one of a boot of the at least one connector or the cable of the at least one connector to extend through the at least one opening 360, as shown in FIGS. 4-7. The at least one opening may sealingly surround at least one of the boot of the at least one connector or the cable extending through the at least one opening. A grommet 370 may be sealingly attached to the at least one opening to sealingly surround at least one of the boot of the at least one connector or the cable extending through the at least one opening.

Figure 4:
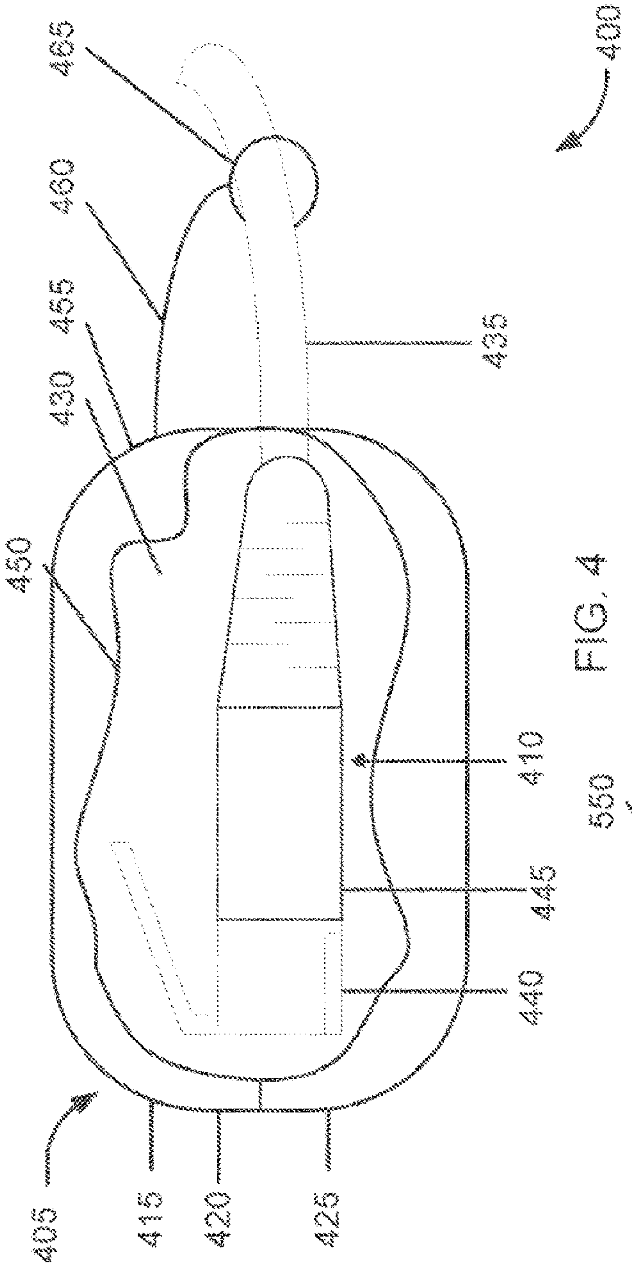
FIG. 4 is a schematic diagram illustrating a system for an enclosure for protecting a connector of a cable or a wire, in accordance with various embodiments.

The enclosure 300 might further include a tether 375 attached to the enclosure housing 305, as shown in FIGS. 4 and 5. A first end 380 of the tether 375 may be adjustable and may be configured to fit over the at least one connector and to tighten over the cable.

The enclosure 300 is further described below with respect to in FIGS. 4-7.

FIG. 4 is a side view of a system 400 comprising an enclosure 405 containing a connector 410, in accordance with various embodiments.

The enclosure 405 might be the same as or similar to enclosure 300 of FIG. 3.

In some embodiments, the enclosure 405 might include an enclosure housing 415. The enclosure housing 415 might include a first part 420 of the enclosure housing 415 and a second part 425 of the enclosure housing 415. The first part 420 of the enclosure housing 415 might be attached to the second part 425 of the enclosure housing 415.

In various embodiments, the first part 420 of the enclosure housing 415 and the second part 425 of the enclosure housing 415 together define a chamber 430 to enclose a connector 410 of a cable or wire 435. The chamber 430 might fully enclose a connector assembly 440 and a connector housing 445 comprising the connector assembly 440 of at least one connector 410 of the cable/wire 435.

The interior of the enclosure 405 containing the connector 410 is shown via cutout line 450. Cutout line 450 exists merely to illustrate the interior of the enclosure 405 containing the connector 410. In an implementation of the enclosure 405, the interior of the enclosure 405 would not be visible.

The enclosure housing 415 might further include at least one opening (not shown) disposed at a first end 455 of the enclosure housing 415. The at least one opening may be configured to allow the cable/wire 435 of the at least one connector 410 to extend through the at least one opening.

The enclosure 400 might further include a tether 460 attached to the enclosure housing 415. A first end 465 of the tether 460 may be adjustable and may be configured to fit over the at least one connector 410 and to tighten over the cable/wire 435.

Figure 5:
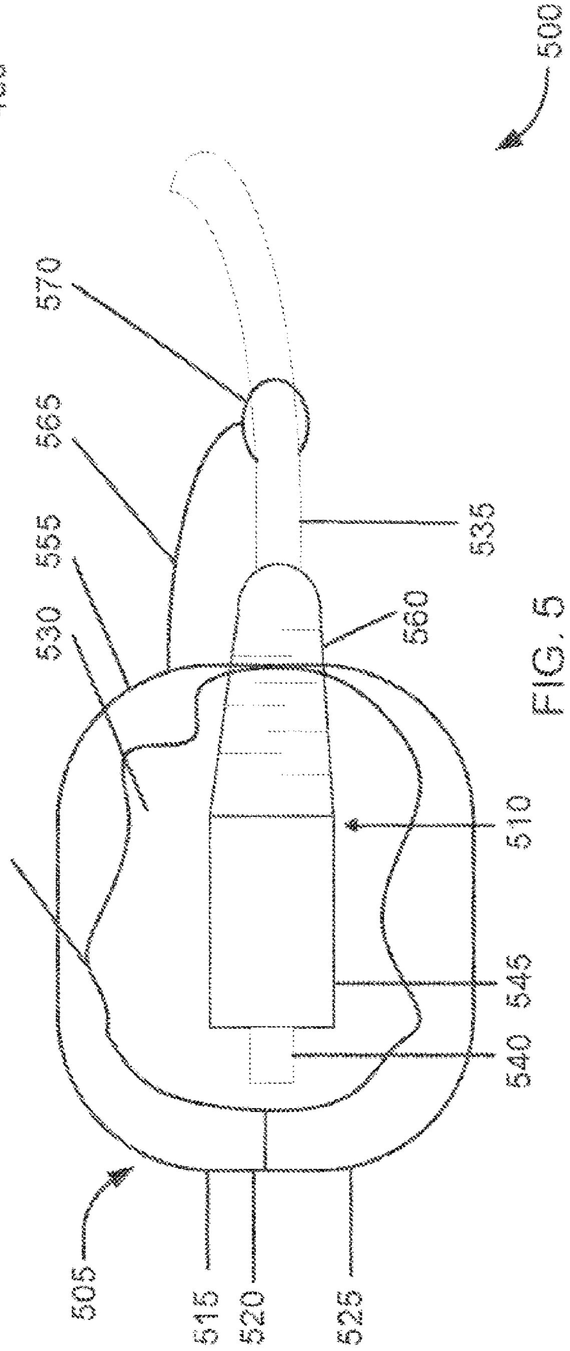
FIG. 5 is a schematic diagram illustrating another system for an enclosure for protecting a connector of a cable or a wire, in accordance with various embodiments.

FIG. 5 is a schematic diagram illustrating a system 500 comprising an enclosure 505 containing a connector 510, in accordance with various embodiments.

The enclosure 505 might be the same as enclosure 300 of FIG. 3 or enclosure 405 of FIG. 4.

In some embodiments, the enclosure 500 might include an enclosure housing 515. The enclosure housing 515 might include a first part 520 of the enclosure housing 515 and a second part 525 of the enclosure housing 515. The first part 520 of the enclosure housing 515 might be attached to the second part 525 of the enclosure housing 515.

In various embodiments, the first part 520 of the enclosure housing 515 and the second part 525 of the enclosure housing 515 together define a chamber 530 to enclose a connector 510 of a cable/wire 535. The chamber 530 might fully enclose a connector assembly 540 and a connector housing 545 comprising the connector assembly 540 of at least one connector 510 of the cable/wire 535.

The interior of the enclosure 505 containing the connector 510 is shown via cutout line 550. Cutout line 550 exists merely to illustrate the interior of the enclosure 505 containing the connector 510. In an implementation of the enclosure 505, the interior of the enclosure 505 would not be visible.

The enclosure housing 515 might further include at least one opening (not shown) disposed at a first end 555 of the enclosure housing 515. The at least one opening may be configured to allow a boot 560 of the at least one connector 510 to extend through the at least one opening. By allowing the boot 560 to extend through the opening, bends in the cable/wire 535 may be prevented or limited.

The enclosure 505 might further include a tether 565 attached to the enclosure housing 515. A first end 570 of the tether 565 may be adjustable and may be configured to fit over the at least one connector and to tighten over the cable/wire 535.

Figure 6:
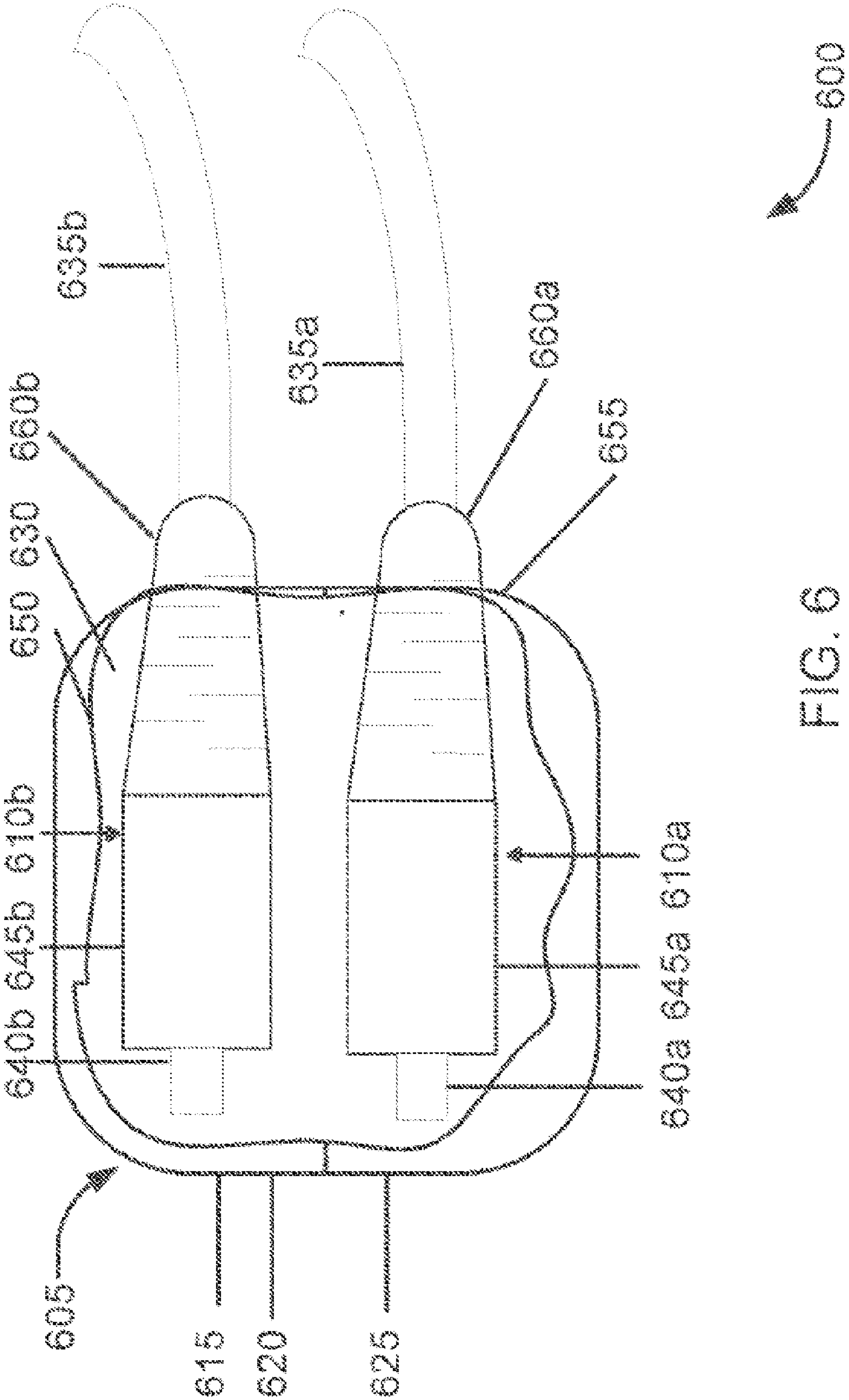
FIG. 6 is a schematic diagram illustrating yet another system for an enclosure for protecting a connector of a cable or a wire, in accordance with various embodiments.

FIG. 6 is a schematic diagram illustrating a system 600 comprising an enclosure 605 for containing two (or more) connectors **610*a* and 610*b* (collectively, "connectors 610**"), in accordance with various embodiments.

The enclosure 605 might be the same as or similar to enclosure 300 of FIG. 3, enclosure 405 of FIG. 4, and/or enclosure 505 of FIG. 5.

In some embodiments, the enclosure 605 might include an enclosure housing 615. The enclosure housing 615 might include a first part 620 of the enclosure housing 615 and a second part 625 of the enclosure housing 615. The first part 620 of the enclosure housing 615 might be attached to the second part 625 of the enclosure housing 615.

In various embodiments, the first part 620 of the enclosure housing 615 and the second part 620 of the enclosure housing 615 together define a chamber 630 to enclose a first connector **610*a* of a cable/wire 635*a* and a second connector 610*b* of a second wire/cable 635*b*. The chamber 630 might fully enclose one or more first connector pins 640*a* and a first connector housing 645*a* comprising the one or more first connector pins 640*a* of the first connector 610*a* and one or more second connector pins 640*b* and a second connector housing 645*b* comprising the one or more second connector pins 640*b* of the second connector 610*b*. The enclosure 600 is not limited to holding only two connectors 610** and may contain more connectors (not shown).

The interior of the enclosure 605 containing the connectors 610 is shown via cutout line 650. Cutout line 650 exists merely to illustrate the interior of the enclosure 605 containing the connectors 610. In an implementation of the enclosure 605, the interior of the enclosure 605 would not be visible.

The enclosure housing 615 might further include at least one opening (not shown) disposed at a first end 655 of the enclosure housing 605. The at least one opening may be configured to allow both the first cable/wire **635*a* and/or a first boot 660*a* of the first connector 610*a* and the second cable/wire 635*b* and/or a second boot 660*b* of the second connector 610*b* to extend through the at least one opening. The first cable/wire 635*a* and/or the first boot 660*a* of the first connector 610*a* and the second cable/wire 635*b* and/or the second boot 660*b* of the second connector 610*b* may extend through the same opening. Alternatively, the first cable/wire 635*a* and/or the first boot 660*a* of the first connector 610*a* and the second cable/wire 635*b* and/or the second boot 660*b* of the second connector 610*b* may extend through different openings located on the first end 655 of the enclosure housing 615**.

Figure 7:
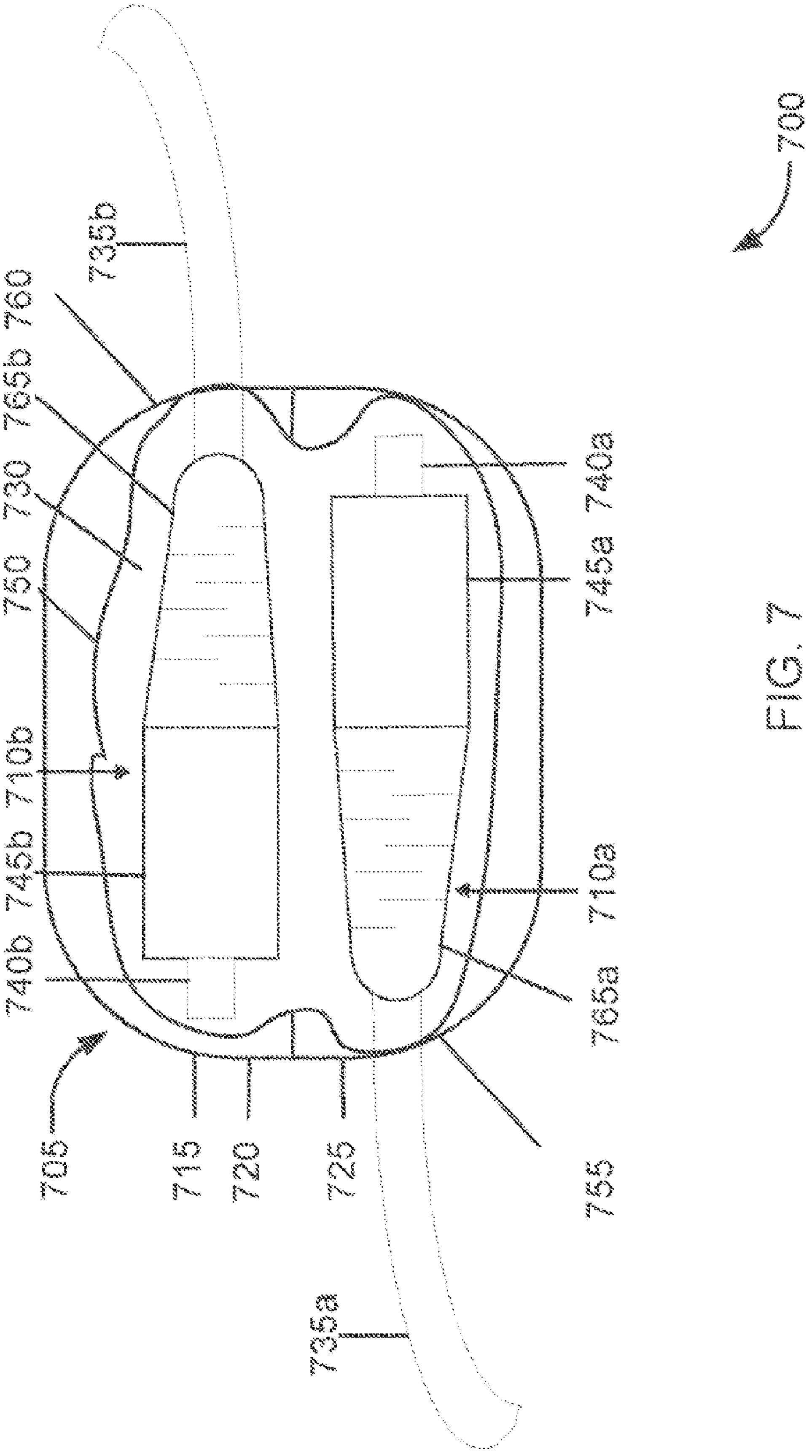
FIG. 7 is a schematic diagram illustrating an additional system for an enclosure for protecting a connector of a cable or a wire, in accordance with various embodiments.

FIG. 7 is a schematic diagram illustrating a system 700 comprising an enclosure 705 for containing two (or more) connectors **710*a* and 710*b* (collectively, "connectors 710**"), in accordance with various embodiments.

The enclosure 705 might be the same as or similar to enclosure 300 of FIG. 3, enclosure 405 of FIG. 4, enclosure 505 of FIG. 5, and/or enclosure 605 of FIG. 6.

In some embodiments, the enclosure 705 might include an enclosure housing 715. The enclosure housing 715 might include a first part 720 of the enclosure housing 715 and a second part 725 of the enclosure housing 715. The first part 720 of the enclosure housing 715 might be attached to the second part 725 of the enclosure housing 715.

In various embodiments, the first part 720 of the enclosure housing 715 and the second part 720 of the enclosure housing 715 together define a chamber 730 to enclose a first connector 710*a* of a cable/wire 735*a* and a second connector 710*b* of a second wire/cable 735*b*. The chamber 730 might fully enclose one or more first connector pins 740*a* and a first connector housing 745*a* comprising the one or more first connector pins 740*a* of the first connector 710*a* and one or more second connector pins 740*b* and a second connector housing 745*b* comprising the one or more second connector pins 740*b* of the second connector 710*b*. The enclosure 705 is not limited to holding only two connectors 710 and may contain more connectors (not shown).

The interior of the enclosure 705 containing the connectors 710 is shown via cutout line 750. Cutout line 750 exists merely to illustrate the interior of the enclosure 705 containing the connectors 715. In an implementation of the enclosure 705, the interior of the enclosure 705 would not be visible.

The enclosure housing 715 might further include at least two openings (not shown) disposed at a first end 755 and a second end 760 of the enclosure housing 715. The first cable/wire 735*a* and/or a first boot 765*a* of the first connector 710*a* may extend through a first opening located on the first end 755. The second cable/wire 735*b* and/or a second boot 765*b* of the second connector 710*b* may extend through a second opening located on the second end 760 of the enclosure housing 715.

Figure 8:
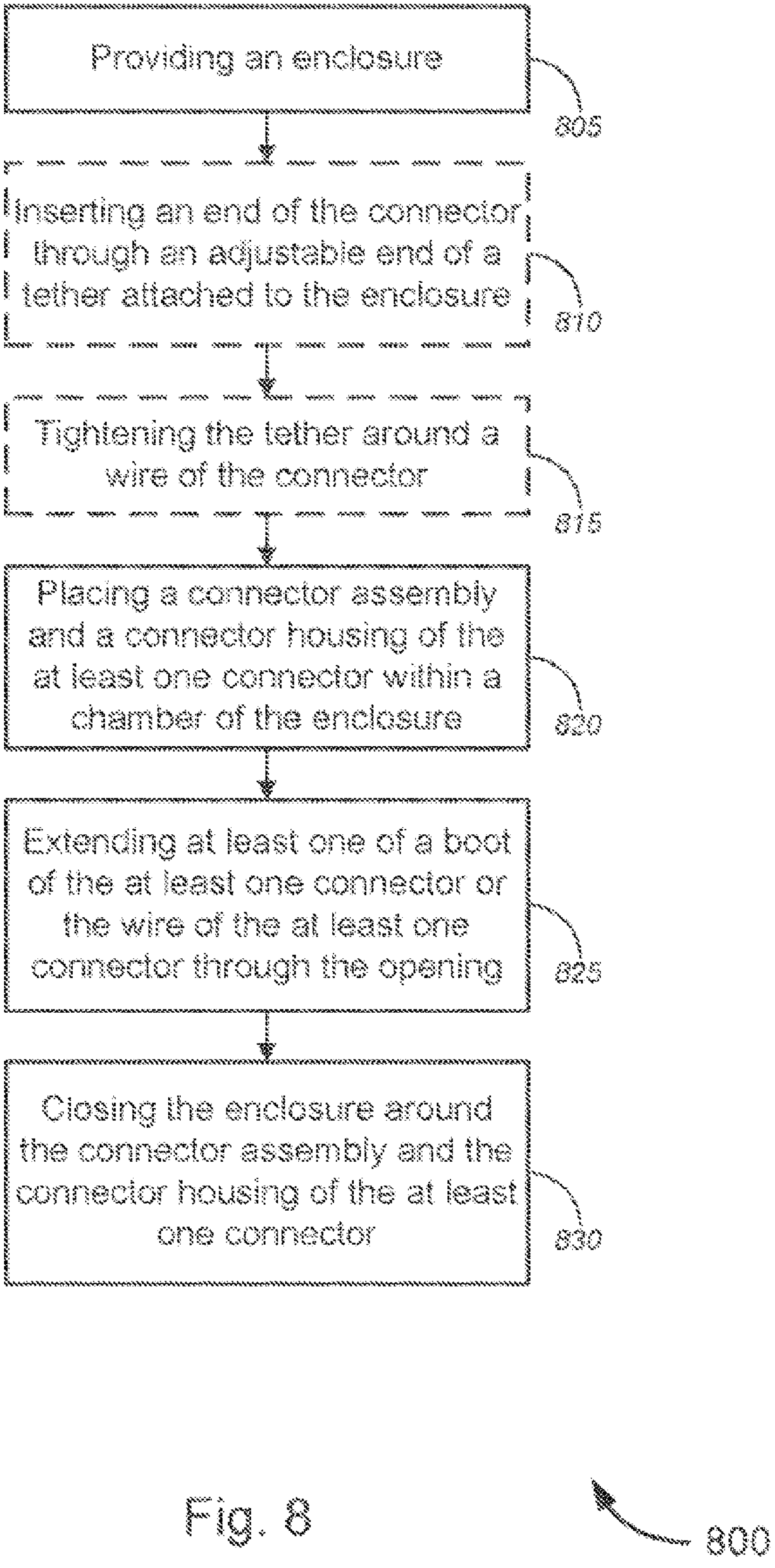
FIG. 8 is a flow diagram illustrating a method for implementing an enclosure for protecting a connector of a cable or a wire, in accordance with various embodiments.

FIG. 8 is a flow diagram illustrating a method 800 for implementing an enclosure for protecting at least one connector of a cable, in accordance with various embodiments.

While the techniques and procedures are depicted and/or described in a certain order for purposes of illustration, it should be appreciated that certain procedures may be reordered and/or omitted within the scope of various embodiments. For example, the blocks depicted by the dash-long dash borders denote optional processes. Moreover, while the method 800 illustrated by FIG. 8 can be implemented by or with (and, in some cases, are described below with respect to) the connectors 100, 200, 410, 510, 610 and 710 of FIGS. 1, 2, 3, 4, 5, 6, and 7, respectively, and enclosures 300, 405, 505, 605, and 705 of FIGS. 1, 2, 3, 4, 5, 6, and 7, respectively, (or components thereof), such methods may also be implemented using any suitable hardware (or software) implementation. Similarly, while each of the connectors 100, 200, 410, 510, 610 and 710 of FIGS. 1, 2, 3, 4, 5, 6, and 7, respectively, and enclosures 300, 405, 505, 605, and 705 of FIGS. 1, 2, 3, 4, 5, 6, and 7, respectively, (or components thereof, can operate according to the method 800 illustrated by FIG. 8, the connectors 100, 200, 410, 510, 610 and 710 of FIGS. 1, 2, 3, 4, 5, 6, and 7, respectively, and enclosures 300, 405, 505, 605, and 705 of FIGS. 1, 2, 3, 4, 5, 6, and 7, respectively, can each also operate according to other modes of operation and/or perform other suitable procedures.

With reference to FIG. 8, method 800, at block 805, might comprise providing an enclosure. The enclosure might comprise an enclosure housing comprising a first part of the enclosure housing and a second part of the enclosure housing. The first part of the enclosure housing might be attached to the second part of the enclosure housing. The first part of the enclosure housing and the second part of the enclosure housing together might define a chamber to fully enclose a connector assembly and a connector housing comprising the connector assembly of the at least one connector of the cable. The enclosure might further include at least one opening disposed at a first end of the enclosure housing. The at least one opening may be configured to allow at least one of a boot of the at least one connector or the cable of the at least one connector to extend through the at least one opening.

In some embodiments, the enclosure might additionally include a tether attached to an outer surface of the enclosure housing. The tether may configured to attach the enclosure to the cable of the connector. A first end of the tether may be adjustable and may be configured to fit over the at least one connector and to tighten over the cable.

The method, at optional block 810, may continue by inserting an end of the connector through the adjustable end of the tether. The adjustable end of the tether may then be tightened around the cable to attach the enclosure to the cable of the connector at optional block 815.

The method, at block 820, might additionally include placing the connector assembly and the connector housing of the at least one connector within the chamber. The method might continue, at block 825, by extending at least one of the boot of the at least one connector or the cable of the at least one connector through the opening. The method might also include, at block 830, closing the enclosure housing around the connector assembly and a connector housing comprising the connector assembly of the at least one connector.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. An enclosure for protecting at least one connector of a cable, the enclosure comprising:

an enclosure housing comprising a first part of the enclosure housing and a second part of the enclosure housing, the first part of the enclosure housing is attached to the second part of the enclosure housing, wherein the first part of the enclosure housing and the second part of the enclosure housing together define a chamber to fully enclose a connector assembly and a connector housing of the at least one connector of the cable, and wherein the first part of the enclosure housing is not detachable from the second part of the enclosure housing;

at least one opening disposed at a first end of the enclosure housing, wherein the at least one opening is configured to allow at least one of a boot of the at least one connector or the cable of the at least one connector to extend through the at least one opening; and a tether attached to an outer surface of the enclosure housing, wherein the tether is configured to attach the enclosure to the cable.

2. The enclosure of claim 1, wherein the at least one connector comprises at least one of an ethernet connector, a fiber connector, or a copper cable connector.

3. The enclosure of claim 1, wherein the cable comprises at least one of an ethernet cable, a fiber, or a copper cable.

4. The enclosure of claim 1, wherein the enclosure housing has at least one of an oval shape, a square shape, a round shape, or a rectangular shape.

5. The enclosure of claim 1, wherein the first part of the enclosure housing is attached to the second part of the enclosure housing via at least one of a hinged connection or a snap connection.

6. The enclosure of claim 1, wherein a first side of the first part of the enclosure housing is attached to a first side of the second part of the enclosure housing via a hinged connection, and wherein a second side of the first part of the enclosure housing is connected to a second side of the second part of the enclosure housing via a snap connection.

7. The enclosure of claim 1, wherein the first part of the enclosure housing is sealingly attached to the second part of the enclosure housing.

8. The enclosure of claim 7, wherein the first part of the enclosure housing is sealingly attached to the second part of the enclosure housing via a grommet that extends along an edge of at least one of the first part of the enclosure housing or the second part of the enclosure housing.

9. The enclosure of claim 1, wherein the at least one opening sealingly surrounds at least one of the boot of the at least one connector or the cable extending through the at least one opening.

10. The enclosure of claim 9, wherein a grommet is sealingly attached to the at least one opening to sealingly surround at least one of the boot of the at least one connector or the cable extending through the at least one opening.

11. The enclosure of claim 1, wherein a first end of the tether is adjustable and is configured to fit over the at least one connector and to tighten over the cable.

12. The enclosure of claim 1, wherein the at least one connector comprises at least two connectors and the chamber is configured to fully enclose the connector assembly and the connector housing corresponding to each connector of the at least two connectors, and wherein at least one of the boot corresponding to each connector of the at least two connectors or the cable corresponding to each connector of the at least two connectors extends out of the at least one opening.

13. The enclosure of claim 1, wherein the at least one connector comprises at least two connectors and the chamber is configured to fully enclose the connector assembly and the connector housing corresponding to each connector of the at least two connectors, and wherein at least one of the boot corresponding to each connector of the at least two connectors or the cable corresponding to each connector of the at least two connectors extends out of a corresponding opening.

14. The enclosure of claim 1, wherein the at least one opening comprises two openings, wherein the two openings are disposed at the first end of the enclosure housing.

15. The enclosure of claim 1, wherein the at least one opening comprises two openings, wherein the two openings are disposed at opposite ends of the enclosure housing.

16. A system comprising:

at least one connector of a cable, the at least one connector comprising:

a connector housing comprising a connector assembly; and a boot attached to the connector housing and the cable;

an enclosure comprising:

an enclosure housing comprising a first part and a second part, the first part of the enclosure housing is attached to the second part of the enclosure housing, wherein the first part of the enclosure housing and the second part of the enclosure housing together define a chamber to fully enclose the connector assembly and the connector housing of the at least one connector of the cable, and wherein the first part of the enclosure housing is not detachable from the second part of the enclosure housing;

at least one opening disposed at a first end of the housing, wherein the at least one opening is configured to allow at least one of the boot of the at least one connector or the cable of the at least one connector to extend through the at least one opening; and a tether attached to an outer surface of the enclosure housing, wherein the tether is configured to attach the enclosure to the cable.

17. The system of claim 16, wherein the at least one connector comprises at least one of an ethernet connector, a fiber connector, or a copper cable connector.

18. A method comprising:

providing an enclosure comprising an enclosure housing comprising a first part, a second part, and a tether, the first part of the enclosure housing is attached to the second part of the enclosure housing, wherein the first part of the enclosure housing and the second part of the enclosure housing together define a chamber to fully enclose a connector assembly and a connector housing of the at least one connector of the cable and at least one opening disposed at a first end of the enclosure housing, wherein the at least one opening is configured to allow at least one of a boot of the at least one connector or the cable of the at least one connector to extend through the at least one opening, wherein the first part of the enclosure housing is not detachable from the second part of the enclosure housing, wherein the tether is attached to an outer surface of the enclosure housing, and wherein the tether is configured to attach the enclosure to the cable;

placing the connector assembly and the connector housing of the at least one connector of the cable within the chamber;

extending at least one of the boot of the at least one connector or the cable of the at least one connector through the opening; and closing the enclosure housing around the connector assembly and the connector housing of the at least one connector.

19. The method of claim 18, wherein the at least one connector comprises at least one of an ethernet connector, a fiber connector, or a copper cable connector.

* * * * *